United States Patent Office 2,838,389
Patented June 10, 1958

2,838,389

METHOD OF COMBATTING WEEDS

Donald M. Yoder, Yonkers, N. Y., assignor to Union Carbide Corporation, a corporation of New York Application September 3, 1952, Serial No. 307,710

1 Claim. (Cl. 71—2.5)

This invention relates to the treatment of soil with a group of chemicals which have been found to prevent the attack on desirable forms of plants, for instance the crop plants pea, asparagus, and pineapple, by undesirable forms of pest organisms, for instance nematodes, as well as the fungi which cause "damping off" diseases and other soil-borne plant diseases, yet, when properly used, do not harm the seeds of crop plants, as peas, nor the seed pieces, as asparagus and pineapple.

The treatment of soil to benefit growing plants has been practiced for many centuries, for instance by the use of fertilizers which promote the growth of the plants. Lately, however, plant pathologists have realized that better plant growth can be obtained if, in addition to fertilizing the plant or its seed, something can also be applied to the soil to kill or inhibit such pests as are frequently found in soil and attack the seeds or seedlings of the desirable plants, or the roots of the plants or attack the plants through the roots; but the material so used must not injure the seeds of the desirable plants nor the roots of these plants, nor the plants themselves. Those parts of crop plants which are below the surface of the soil are attacked by both the animal and plant types of parasites and the object of the present invention is the prevention of such attack by both types of parasites without in any way materially harming the growth and development of desirable crop seeds, seedlings and plants and to accomplish this result in a simple and economical manner.

The compounds which have been found to give this result are 3,5-dimethyl tetrahydro-1,3,5,2-thiadiazine-2-thione having the structural formula

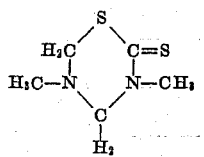

and its diethyl analogue 3,5-diethyl tetrahydro-1,3,5,2-thiadiazine-2-thione.

The materials are characterized by being heterocyclic hexanes having one sulfur and two nitrogen atoms alternating with carbon atoms in the ring with a keto-sulfur on one of the carbon atoms next to the sulfur in the ring and methyl or ethyl groups on each of the nitrogen atoms.

The general formula is

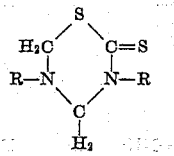

where R is $CH_3$ or $C_2H_5$.

When these compounds are applied to soil they kill nematodes and also the fungi which cause damping off disease. The application may be in any suitable manner, for instance by application to the surface of a field or by drilling them into the soil. They are preferably applied with an extender in order to obtain even distribution. The extender may be water, in which case a solution or a suspension of the material is sprayed over the field or the material is proportionately fed into irrigation water. The extender may be a solid, for instance talc, clay, or a diatomaceous earth or any other common inert extender, suitably ground, in which case the composition may be dusted over the field or suspended in water and sprayed or mixed into irrigation water. The extender may also be fertilizer, the compound being mixed with the fertilizer and then applied to the soil either on the surface or, preferably, by drilling it below the surface or by discing or harrowing the composition into the soil. A preferred composition is a solid extender carrying the compound, prepared by applying a solution or homogeneous suspension of the compound to the extender to make a homogeneous composition, driving off the solvent or suspending agent leaving the extender impregnated with the compound, and comminuting if desirable. In case the extender is fertilizer, the amount of compound used may be such that when the composition is applied to the soil at the usual rate at which fertilizer is applied, the correct amount of toxicant is applied per acre. In case the extender is either fertilizer or an inert solid, a composition in the nature of a concentrate may be prepared containing a small proportion of the extender and a large proportion of the compound, this composition being adapted to admixture with more extender, either solid or liquid, for spraying, dusting, drilling or other application to the soil.

The compounds may be applied at the rate of from 10 to 1000 pounds per acre (from 10 to 200 pounds per acre for soil fungi and from 100 to 1000 pounds per acre for both fungi and nematodes) in any suitable manner preferably, however, in such a manner that the compound is deposited below the surface, that is either being drilled or harrowed into the soil or applied to the surface sufficiently prior to planting the seed that it leeches into and permeates the soil at the depth at which the seeds are planted and at the depth to which the roots grow, and between these depths and the surface of the soil where the damping off and other diseases are active. The toxicant is preferably used in preplanting treatments in order that the soil be freed of the parasites before the seed is planted.

In testing the materials disclosed herein as operative, in comparison with other materials which proved to be inoperative, spore germination tests were made. Essentially this test method consisted in germinating spores in continual contact, on glass slides, with given concentrations of the chemical under test, and observing the germination after 24 hours. The general procedure used is more fully disclosed in U. S. Patent No. 2,540,170, column 3, line 34 et seq. and in Phytopathology, July 1943, vol. XXXIII, No. 7, pp. 627–632. The fungi used in the tests were *Sclerotinia fructicola* (Wint.) Rehm, and *Alternaria oleracea* Milbraith indicated as *S. f.* and *A. o.* in the headings of the two left hand columns of data on the following Table 1. In making the solutions, the required weight of the chemical (1 gram) was dissolved in 2 cc. of acetone and then diluted with water to give 1000 grams which corresponds to a concentration of 1000 parts per million (1000 p. p. m.). Portions of the 1000 p. p. m. solution were diluted to give 10 and 100 p. p. m. concentrations. These solutions were used in the spore germination tests and the chemicals were rated A, B, C, and D; A meaning that at 10 p. p. m. the chemical killed or inhibited the development of at least 50% of the spores (L. D. 50 value), B meaning that 10 p. p. m. did not but 100 p. p. m. did give at least an L. D. 50 value, C meaning that 100 p. p. m. did not but 1000 p. p. m. did give at least an L. D. 50 value, and D meaning that the L. D. 50 value was greater than 1000 p. p. m. The acetone was used in the preparation of the solutions to facilitate solution of the solute but the acetone was so dilute in the final solutions that it did not affect the biological results.

In further testing the materials in soil tests against "damping off" disease, an equal weight (1 pound, in these tests) of soil from a supply of soil known to be infected by fungi causing "damping off" and regularly used for "damping off" tests, was placed in each of a series of small pots. A given weight of each of the test materials was then dissolved in 5 cc. of acetone and added to 45 cc. of water and evenly distributed over the surface of the soil in the respective pots. Thereafter 50 cc. of water containing no added material was distributed over the soil in each pot to facilitate distribution of the test material in the soil. The next day, the upper 1 to 1½ inches of soil was removed from each pot in turn, ten pea seeds were laid on the soil remaining in each pot, and the soil which was removed from the pot was replaced, the seeds thus being planted about 1 to 1½ inches below the surface of the soil and the test chemical being quite evenly distributed in the soil above the seeds by the original distribution of the chemical, the subsequent watering and thereafter the mixing of the soil incident to its removal from the pot and its replacement.

After planting the seeds, the pots were held in a dark room at 10° C. for seven days as these conditions simulate the conditions of early spring plantings when "damping off" is most severe and are the conditions under which the parasites have been found to develop the best. After the cold room treatment, the pots were benched in a greenhouse and watered as necessary for good plant grow with water containing no chemical. The number of seedlings emerged was recorded over a period of a week after emergence first started, the average number of emerged seedlings in three replicates being expressed in the two right hand columns in the following Table 1 as percent of the seeds planted.

Each chemical was tested at two concentrations, namely 110 and 55 parts per million, by weight of the chemical, based on the weight of the soil in the pot, corresponding to applications of 55 and 28 pounds, respectively, of the chemical per acre of soil surface. Each test was made in triplicate. As all of the chemicals tested were easily and quickly soluble in acetone, solutions of such strength were made that 5 cc. of the acetone solutions mixed with 45 cc. of water gave the aqueous solutions used to supply the respective chemicals to the soil. The pea seeds used in the tests were in their natural state, that is they had not been given fungicidal or other pre-planting treatments. Check plantings carried along with the test plantings, and receiving the same treatment except that one set of checks received 45 cc. of water and 5 cc. of acetone and the other set of checks received 50 cc. of water, respectively, at the first watering gave zero emergence.

The so-called "damping off" disease is caused by a group of soil-borne fungi including Fusarium sp., Pythium sp., and Rhizoctonia sp., which are responsible for the killing of seedlings of many plants in the early stages of their growth. The seedlings are killed either before they emerge from the soil or shortly thereafter.

TABLE 1

Slide germination and soil fungicide tests

| Chemical No. | Name | Structure | LD50 Rating | | Soil Fungicide, Percent Emergence | |
|---|---|---|---|---|---|---|
| | | | S.f. | A.o. | 110 p. p. m. | 55 p. p. m. |
| 1 | 3,5-dimethyl tetra-hydro-1,3,5,2-thiadiazine-2-thione. | (structure) | A | A | 87 | 100 |
| 2 | 3,5-diethyl tetra-hydro-1,3,5,2-thiadiazine-2-thione. | diethyl analogue | A | A | 100 | 27 |
| 3 | 3,5-diisopropyl tetrahydro-1,3,5,2-thiadiazine-2-thione. | diisopropyl analogue | A | B | 33 | 3 |
| 4 | 3,5-dibutyl tetra-hydro-1,3,5,2-thiadiazine-2-thione. | dibutyl analogue | C | B− | 10 | 13 |
| 5 | 3,5-di(2-ethylhexyl) tetrahydro-1,3,5,2-thiadiazine-2-thione. | di(2-ethyl hexyl) analogue | D | D | 0 | 0 |
| 6 | 3,5-diphenyl tetra-hydro-1,3,5,2-thiadiazine-2-thione. | diphenyl analogue | D | D | 0 | 0 |
| 7 | 2-mercapto, 3-thiazoline. | (structure) | D | D | 0 | 0 |
| 8 | 2-mercapto dihydro-1,3-thiazine. | (structure) | D | D | 3 | 0 |
| 9 | 2,4-diamino thiazole hydrochloride. | (structure) | D | D | 3 | 0 |
| Untreated control | | | | | | 0 |

Tests of the effectiveness of these compounds in the control of nematodes were made. These tests were conducted on a sample of greenhouse soil heavily infested with the root-knot nematode, *Heterodera marioni*. Two pounds of this infested soil were placed in each of a number of clay pots of suitable size. The soil was treated by thoroughly mixing the dry chemical into the two pounds of infested soil at the dosage rates given at the heads of the columns on Table 2. The pots were watered thoroughly after treatment and allowed to set unmolested for a period of two weeks. Then a tomato plant about four inches in height (variety Bonny Best) was transplanted into each pot. The plants were allowed to grow for about a month after which they were removed from the soil and the roots examined for galling. The amount of galling caused by the surviving nematodes is a measure of the nematocidal effectiveness of the chemicals applied. Check or control soil and plants received the same treatment except that no chemical was mixed into the soil. The data from this test is given in the following Table 2, the numbers identifying the same chemicals as in Table 1.

TABLE 2

*Nematocide test—Amount of galling*

| Chemical No. | Replicate | Dosage in lbs./acre | | | | | | |
|---|---|---|---|---|---|---|---|---|
| | | 882 | 441 | 220 | 110 | 55 | 28 | 14 |
| 1 | A | none | none | none | slight | moderate | moderate | heavy. |
| | B | do | do | do | none | do | heavy | Do. |
| 2 | A | do | do | heavy | heavy | heavy | do | Do. |
| | B | do | | slight | do | do | do | Do. |
| 3 | A | heavy | heavy | heavy | do | do | do | Do. |
| | B | do | | do | do | do | do | Do. |
| 5 | A | moderate | do | do | do | do | do | Do. |
| | B | heavy | do | do | moderate | do | do | Do. |
| 6 | A | do | do | do | heavy | do | do | Do. |
| | B | do | do | do | do | do | do | Do. |
| Check (None) | A | heavy | | | | | | |
| | B | heavy | | | | | | |

In the experiments wherein the materials were applied to the soil it was found that they were effective as preemergence herbicides. To test this in the greenhouse under reproducible conditions equal numbers of radish seeds and equal numbers of rye grass seeds were placed on the surface of soil in pots. The radish seeds were used to represent weed seeds as both radish and weed seeds are small seeds which germinate quickly and in the upper layers of the soil. The seeds were then covered with soil to the depth of ¼ inch and all of the pots flooded with water to wet and to settle the soil. After three hours during which the soil drained and the seeds imbibed moisture, two pots containing radish seeds and two pots containing grass seeds were each treated with 40 cc. of water containing 0.18 gram of Chemical No. 1. This corresponds to a rate of 200 pounds of Chemical No. 1 per acre of soil surface. Other pots were treated with Chemical No. 1 at the acre rate of 100 pounds, 50 pounds and 25 pounds of the chemical. Other pots were treated with Chemicals No. 2, No. 3, and No. 4 at the rates shown on the following Table 3. The pots were then placed in the greenhouse and watered as necessary for plant growth with water containing no chemical. Check or control pots received the same treatment except that the water applied contained no chemical at any time. After fourteen days in the greenhouse, readings were taken of the number of radish and grass plants growing in the respective pots and the data is given in Table 3 as percent of the seeds planted. Thus for radish, 80 percent of the seeds planted came up as plants and, for grass 57 percent of the seeds planted developed into plants in the check pots which received no chemical. In the pots where Chemical No. 1 was applied at the acre rate of 200 pounds, 2 percent of the radish seeds and none of the grass seeds developed, and so on for the other chemicals at the rates and with the results given in Table 3, the numbers identifying the same chemicals as in Table 1.

TABLE 3

*Pot germination tests*

| Compound Number | Rate in lbs./acre surface | | | | | | | |
|---|---|---|---|---|---|---|---|---|
| | 200 | 100 | 50 | 25 | 200 | 100 | 50 | 25 |
| | Percent Emergence (Average of two replicates) | | | | | | | |
| | radish | | | | rye grass | | | |
| 1 | 2 | 6 | 42 | 78 | 0 | 12 | 2 | 36 |
| 2 | 4 | 44 | 66 | 78 | 0 | 2 | 34 | 80 |
| 3 | 50 | 68 | 80 | 92 | 12 | 38 | 56 | 74 |
| 4 | | 58 | 86 | 72 | | 52 | 74 | 68 |
| Untreated Check | | 80 | | | | 57 | | |

From the above data it will be seen that at the acre rates at which Chemicals No. 1 and No. 2 are used to control nematodes (Table 2), the germination of grass and weed seeds in the upper layers of soil is inhibited or prevented.

The Chemical No. 1 was made by the addition of 42 pounds of carbon disulfide to a mixture of 78.5 pounds of a 40% water solution of methylamine and 83 pounds of water at 20° C. to yield methylaminomethyldithiocarbamate. To the reacted mass was added 90 pounds of 37% formalin at 20° to 25° C. The product separated as a precipitate, liquids were removed by centrifugation, the product washed with water and dried. The relation of the reactants is: 2 mols of amine reacted with 1 mole of carbon disulfide and the make reacted with 2 mols of formaldehyde to yield 1 mole of product and 2 mols of water.

The entire process up to separating the product from the liquids can be practiced in a single vessel, for instance of glass or, more conveniently, in a stainless stell, jacketed reactor fitted with an agitator. The reactions can be conducted at temperatures from about 0° C. to 45° C. or higher or lower; however, at temperatures above 45° C. side reactions may occur and below 0° C. the reaction rate is too slow to be practical. The carbon disulfide is preferably added slowly to the methylamine, for instance at the rate of about 10 pounds per hour with agitation; and after the addition of the sulfide the agitation was continued for about an hour in the above process. The formalin is also preferably added slowly, for instance at the rate of about 40 pounds per hour, with agitation; and, thereafter, the agitation may well be continued for about an hour. The slow addition of the sulfide and formalin and adequate stirring assures quite complete reaction and requires the passage of little or no cooling medium through the jacket of the reactor. The product when dried in a rotary vacuum dryer at 50° C. and at a pressure of about 20 inches of mercury was a white crystalline solid melting at 105–108° C. The material is soluble in water to the extent of 0.12 part by weight in 100 parts of water at 28° C. but would, in general, be classed as insoluble in water, methanol, ethanol and non-polar solvents such as benzene, hexane and heptane. It is quite soluble, however, in acetone, methylethyl ketone, dioxane and similar solvents, the solubility in acetone being approximately 25 grams, in trichloroethane 30 grams, in ethylene dichloride 20 grams, in cyclohexanone and phenylmethyl carbinol 10 grams, and in ethyl acetate 4 grams, per 100 cc. of solvent.

In the manner previously described, the analogues of No. 1 were prepared.

No. 2 was a white, crystalline solid with a melting point of 72° C. and solubilities substantially the same as given for No. 1. In the production of Chemical No. 2, ethylamine was used in the molar proportions previously given instead of methylamine. The reaction temperatures, times and other conditions are the same as previously given for No. 1.

No. 3 was a white, crystalline solid with a melting point of 118° C. and solubilities substantially the same as given for No. 1. In the production of No. 3, isopropylamine was used in the molar proportions previously given instead of methylamine. The reaction temperatures, times and other conditions are the same as previously given for No. 1.

In the production of No. 4, butylamine was used in the molar proportions previously given instead of methylamine. The product was a white, crystalline solid with a melting point of 35°–37° C. and solubilities substantially the same as given for No. 1. The reaction temperatures, times and other conditions are the same as previously given for No. 1.

In the production of No. 5, 2-ethylhexylamine was used in the molar proportions and under the reaction conditions previously described. The product was a yellow viscous oil having a specific gravity of 0.980 at 27°/20° C. and less soluble in water than No. 1. It was obtained as a residue product.

In the production of No. 6, phenylamine was used in the molar proportions and under the reaction conditions previously described. The product was a white, crystalline solid with a melting point of 168° C. and less soluble in water than No. 1.

Compositions particularly adapted for production for the use described comprise 100 parts by weight of Chemical No. 1 or No. 2 with from ½ to 1½ parts of a non-ionic surface active and wetting agent, these amounts of such agents and the like being used to prepare wettable powders which are adapted and intended to be mixed with any of the previously mentioned extenders for application in any of the ways previously set forth, the non-ionic agents used with the said chemicals having been found not to affect deleteriously the crop plants or their seeds. General types of wetting agents may be used but non-ionic agents are preferred. Suitable non-ionic agents for preparing preferred compositions are marketed under the proprietary names "Tergitol NPX" and "Tergitol XC." These agents are solids, the first being a mixture of homologous alkyl aryl polyglycol ethers and the second being an alkyl ether of a polyglycol. Both agents are soluble and stable in acidic, alkaline, and hard water systems and are stable in the presence of salts; also they are soluble and stable in most organic and inorganic compounds including bleaches, methanol, acetone, ethylene glycol as well as other alcohols, ketones, glycols, glycol ethers and esters and aromatic and chlorinated solvents as toluene and ethylene dichloride. Compositions prepared in this manner are thus especially adapted for the present invention.

What is claimed is:

The method of combatting weeds comprising applying to soil containing weed seeds a phytotoxic amount of a compound having the structural formula

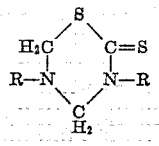

wherein R is selected from the group consisting of methyl and ethyl and both R's are the same.

References Cited in the file of this patent

UNITED STATES PATENTS 2,537,633    Smith                Jan. 9, 1951

FOREIGN PATENTS 555,795    Great Britain          Sept. 8, 1943

OTHER REFERENCES

Biochemical Journal, volume 43, (1948), page 465.

Walker: Serial Number 642,121, Official Gazette, volume 659, page 588, June 10, 1952.